United States Patent
Hooli et al.

(10) Patent No.: US 9,326,155 B2
(45) Date of Patent: Apr. 26, 2016

(54) SPECTRUM SHARING USING SHARING PROFILES

(75) Inventors: Kari Juhani Hooli, Oulu (FI); Esa Tapani Tiirola, Kempele (FI); Jari Yrjana Hulkkonen, Oulu (FI)

(73) Assignee: Nokia Solutions and Networks Oy, Espoo (FI)

( * ) Notice: Subject to any disclaimer, the term of this patent is extended or adjusted under 35 U.S.C. 154(b) by 92 days.

(21) Appl. No.: 14/346,167

(22) PCT Filed: Sep. 23, 2011

(86) PCT No.: PCT/FI2011/050825
§ 371 (c)(1),
(2), (4) Date: Mar. 20, 2014

(87) PCT Pub. No.: WO2013/041757
PCT Pub. Date: Sep. 23, 2011

(65) Prior Publication Data
US 2014/0226609 A1 Aug. 14, 2014

(51) Int. Cl.
*H04Q 7/00* (2006.01)
*H04W 16/14* (2009.01)
*H04W 74/08* (2009.01)
*H04W 72/04* (2009.01)

(52) U.S. Cl.
CPC ............ *H04W 16/14* (2013.01); *H04W 72/042* (2013.01); *H04W 74/0833* (2013.01); *H04W 72/0426* (2013.01)

(58) Field of Classification Search
USPC ....................................................... 455/454
See application file for complete search history.

(56) References Cited

U.S. PATENT DOCUMENTS

| 7,599,686 B2 * | 10/2009 | Quinn et al. ................ 455/423 |
| 2003/0181213 A1 * | 9/2003 | Sugar et al. ................ 455/454 |
| 2009/0232066 A1 * | 9/2009 | Rinne et al. ................ 370/329 |
| 2010/0246442 A1 | 9/2010 | Wang et al. ................ 370/254 |

FOREIGN PATENT DOCUMENTS

| WO | WO 2012/041393 A1 | 4/2012 |
| WO | WO 2012/069081 A1 | 5/2012 |
| WO | WO 2012/107106 A1 | 8/2012 |

OTHER PUBLICATIONS

3GPP TSG-RAN WG4 Meeting #56, Madrid, Spain, Aug. 23-27, 2010, R4-102978, "On Resource Partitioning Between Macro and HeNBs", Nokia Corp., Nokia Siemens Networks, 9 pgs.

* cited by examiner

*Primary Examiner* — Duc C Ho
(74) *Attorney, Agent, or Firm* — Harrington & Smith

(57) ABSTRACT

The invention relates to an apparatus including at least one processor and at least one memory including a computer program code, the at least one memory and the computer program code configured to, with the at least one processor, cause the apparatus at least to: convey a set of changeable sharing profiles to a node being a secondary user of the shared spectrum, the set of changeable sharing profiles including changeable spectrum sharing conditions; change at least one sharing profile of the set of changeable sharing profiles during shared spectrum usage, and indicate the change of the at least one sharing profile to the node being the secondary user of the shared spectrum.

27 Claims, 5 Drawing Sheets

SPECTRUM SHARING USING SHARING PROFILES

FIELD

Figure 1:
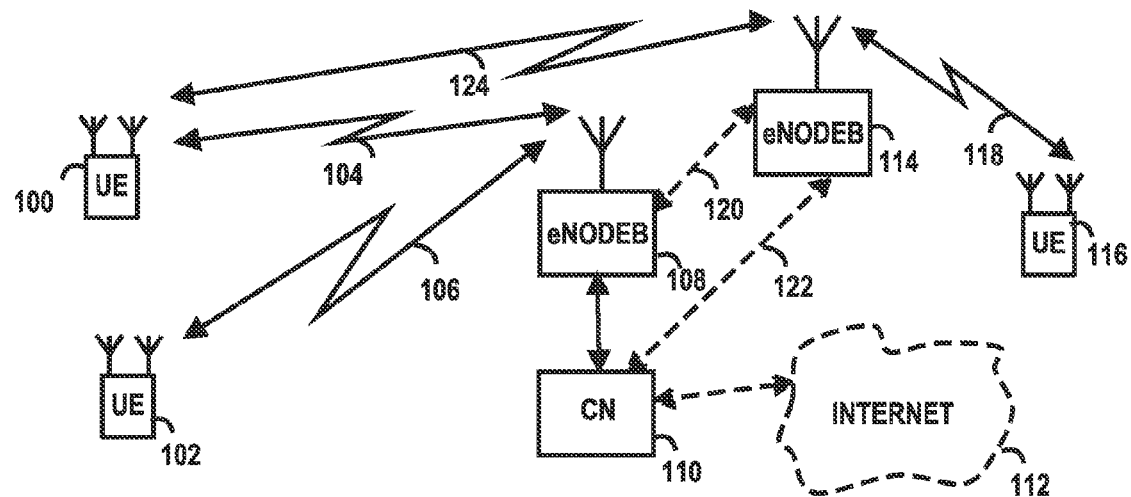

The invention relates to apparatuses, methods, a system, computer programs, computer program products and computer-readable media.

BACKGROUND

The following description of background art may include insights, discoveries, understandings or disclosures, or associations together with disclosures not known to the relevant art prior to the present invention but provided by the invention. Some such contributions of the invention may be specifically pointed out below, whereas other such contributions of the invention will be apparent from their context.

Recently need for more efficient usage of radio resources has brought out an idea of co-existence or sharing of systems meaning that systems share operational resources, for example spectrum in a given region.

BRIEF DESCRIPTION

According to an aspect of the present invention, there is provided an apparatus comprising: at least one processor and at least one memory including a computer program code, the at least one memory and the computer program code configured to, with the at least one processor, cause the apparatus at least to: convey a set of changeable sharing profiles to a node being a secondary user of the shared spectrum, the set of changeable sharing profiles comprising changeable spectrum sharing conditions; change at least one sharing profile of the set of changeable sharing profiles during shared spectrum usage, and indicate the change of the at least one sharing profile to the node being the secondary user of the shared spectrum.

According to an aspect of the present invention, there is provided an apparatus comprising: at least one processor and at least one memory including a computer program code, the at least one memory and the computer program code configured to, with the at least one processor, cause the apparatus at least to: obtain at least one sharing profile indicator of at least one changed sharing profile of a set of changeable sharing profiles from a node being a primary user of shared spectrum; indicate the at least one sharing profile indicator to a node being a secondary user of the shared spectrum, and obtain an acknowledgement of indication of the at least one sharing profile indicator from the node being the secondary user of the shared spectrum an convey the acknowledgement to the node being the primary user of the shared spectrum.

According to an aspect of the present invention, there is provided an apparatus comprising: at least one processor and at least one memory including a computer program code, the at least one memory and the computer program code configured to, with the at least one processor, cause the apparatus at least to: obtain a set of changeable sharing profiles from a node being a secondary user or a primary user of the shared spectrum, the set of sharing profiles comprising changeable spectrum sharing conditions; obtain at least one sharing profile indicator of at least one changed sharing profile of the set of changeable sharing profiles, and convey an acknowledgement of obtaining the sharing profile indicator of at least one changed sharing profile of the set of changeable sharing profiles.

According to yet another aspect of the present invention, there is provided a method comprising: conveying a set of changeable sharing profiles to a node being a secondary user of the shared spectrum, the set of changeable sharing profiles comprising changeable spectrum sharing conditions; changing at least one sharing profile of the set of changeable sharing profiles during shared spectrum usage, and indicating the change of the at least one sharing profile to the node being the secondary user of the shared spectrum.

According to yet another aspect of the present invention, there is provided a method comprising: obtaining at least one sharing profile indicator of at least one changed sharing profile of a set of changeable sharing profiles from a node being a primary user of shared spectrum; indicating the at least one sharing profile indicator to a node being a secondary user of the shared spectrum, and obtaining an acknowledgement of indication of the at least one sharing profile indicator from the node being the secondary user of the shared spectrum an convey the acknowledgement to the node being the primary user of the shared spectrum.

According to yet another aspect of the present invention, there is provided a method comprising: obtaining a set of changeable sharing profiles from a node being a secondary user or a primary user of the shared spectrum, the set of sharing profiles comprising changeable spectrum sharing conditions; obtaining at least one sharing profile indicator of at least one changed sharing profile of the set of changeable sharing profiles, and conveying an acknowledgement of obtaining the sharing profile indicator of at least one changed sharing profile of the set of changeable sharing profiles.

According to yet another aspect of the present invention, there is provided an apparatus comprising: means for conveying a set of changeable sharing profiles to a node being a secondary user of the shared spectrum, the set of changeable sharing profiles comprising changeable spectrum sharing conditions; means for changing at least one sharing profile of the set of changeable sharing profiles during shared spectrum usage, and means for indicating the change of the at least one sharing profile to the node being the secondary user of the shared spectrum.

According to yet another aspect of the present invention, there is provided an apparatus comprising: means for obtaining at least one sharing profile indicator of at least one changed sharing profile of a set of changeable sharing profiles from a node being a primary user of shared spectrum; means for indicating the at least one sharing profile indicator to a node being a secondary user of the shared spectrum, and means for obtaining an acknowledgement of indication of the at least one sharing profile indicator from the node being the secondary user of the shared spectrum an convey the acknowledgement to the node being the primary user of the shared spectrum.

According to yet another aspect of the present invention, there is provided an apparatus comprising: means for obtaining a set of changeable sharing profiles from a node being a secondary user or a primary user of the shared spectrum, the set of sharing profiles comprising changeable spectrum sharing conditions; means for obtaining at least one sharing profile indicator of at least one changed sharing profile of the set of changeable sharing profiles, and means for conveying an acknowledgement of obtaining the sharing profile indicator of at least one changed sharing profile of the set of changeable sharing profiles.

According to yet another aspect of the present invention, there is provided a computer program embodied on a computer-readable storage medium, the computer program comprising program code for controlling a process to execute a process, the process comprising: A computer program embodied on a computer-readable storage medium, the computer program comprising program code for controlling a process to execute a process, the process comprising: conveying a set of changeable sharing profiles to a node being a secondary user of the shared spectrum, the set of changeable sharing profiles comprising changeable spectrum sharing conditions; changing at least one sharing profile of the set of changeable sharing profiles during shared spectrum usage, and indicating the change of the at least one sharing profile to the node being the secondary user of the shared spectrum.

According to yet another aspect of the present invention, there is provided a computer program embodied on a computer-readable storage medium, the computer program comprising program code for controlling a process to execute a process, the process comprising: obtaining at least one sharing profile indicator of at least one changed sharing profile of a set of changeable sharing profiles from a node being a primary user of shared spectrum; indicating the at least one sharing profile indicator to a node being a secondary user of the shared spectrum, and obtaining an acknowledgement of indication of the at least one sharing profile indicator from the node being the secondary user of the shared spectrum an convey the acknowledgement to the node being the primary user of the shared spectrum.

According to yet another aspect of the present invention, there is provided a computer program embodied on a computer-readable storage medium, the computer program comprising program code for controlling a process to execute a process, the process comprising: obtaining a set of changeable sharing profiles from a node being a secondary user or a primary user of the shared spectrum, the set of sharing profiles comprising changeable spectrum sharing conditions; obtaining at least one sharing profile indicator of at least one changed sharing profile of the set of changeable sharing profiles, and conveying an acknowledgement of obtaining the sharing profile indicator of at least one changed sharing profile of the set of changeable sharing profiles.

LIST OF DRAWINGS

Figure 2:
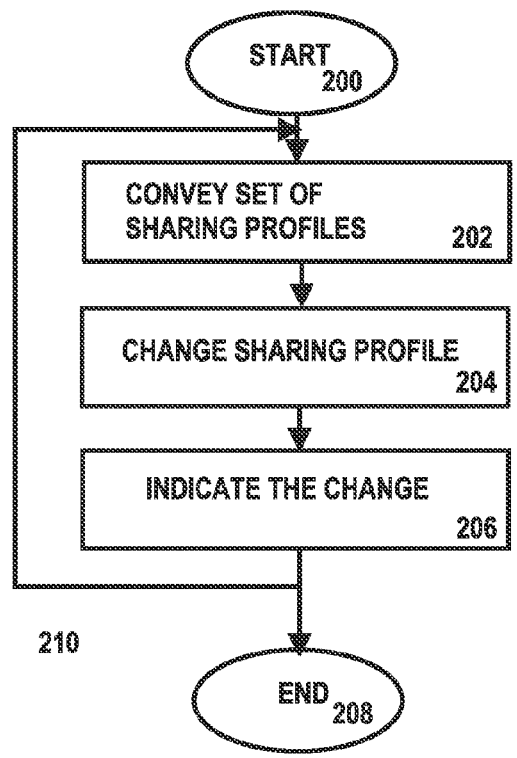
Figure 3:
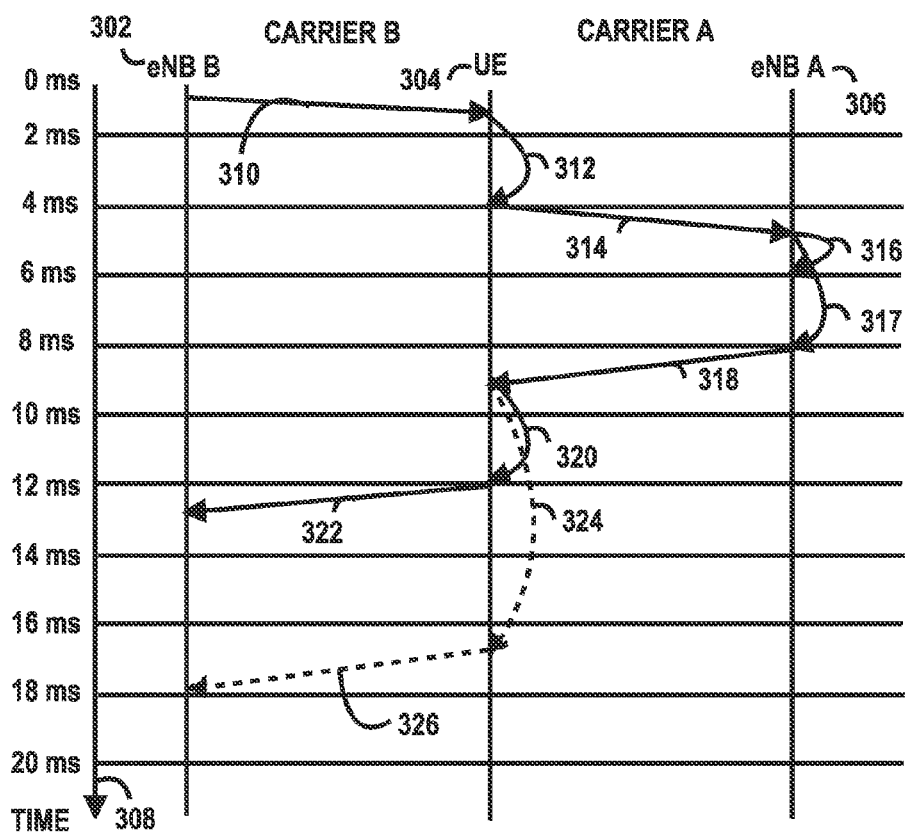
Figure 4:
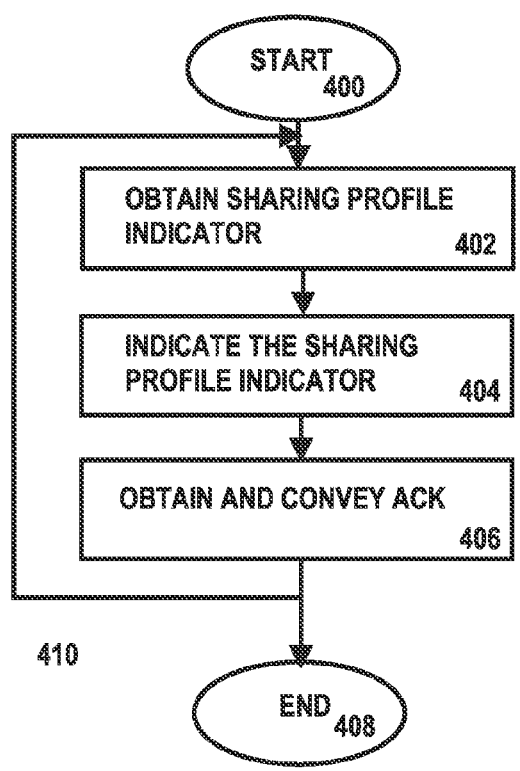
Figure 5:
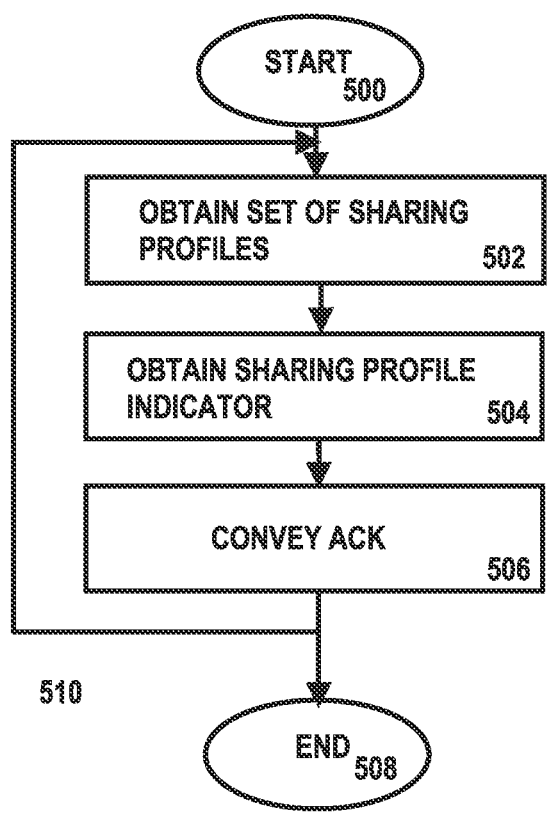
Figure 7:
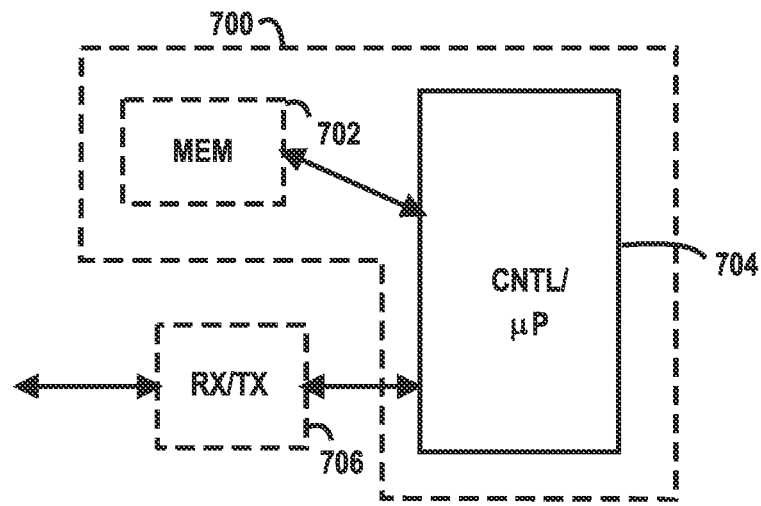
Figure 6:
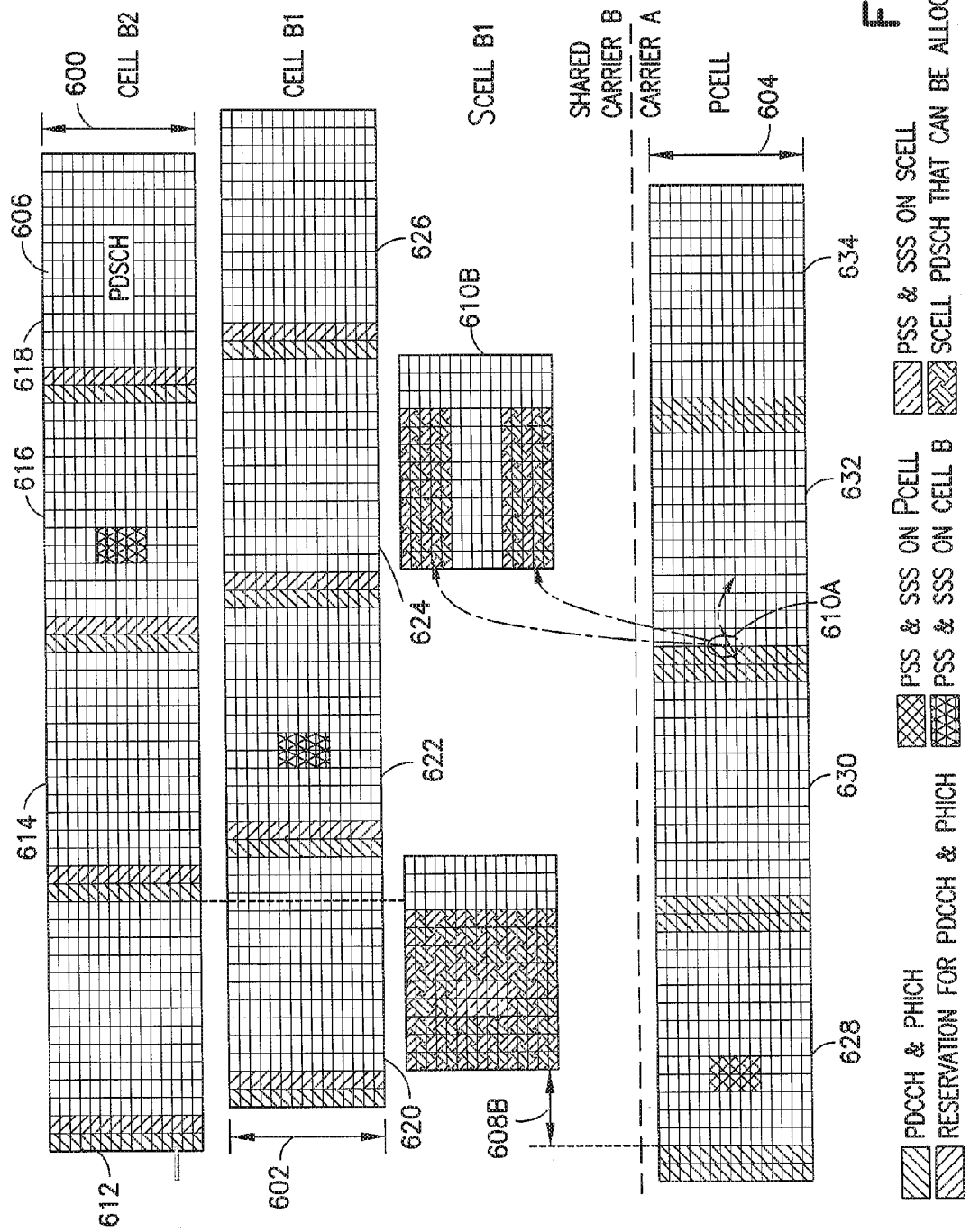
Figure 8:
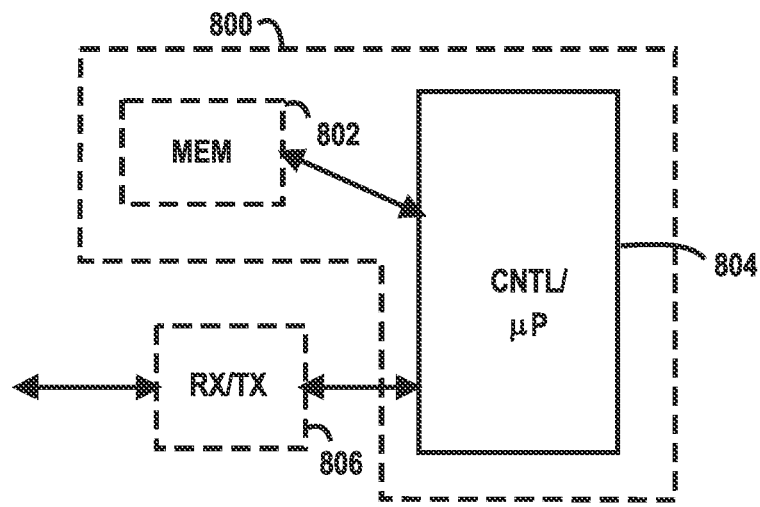
Figure 9:
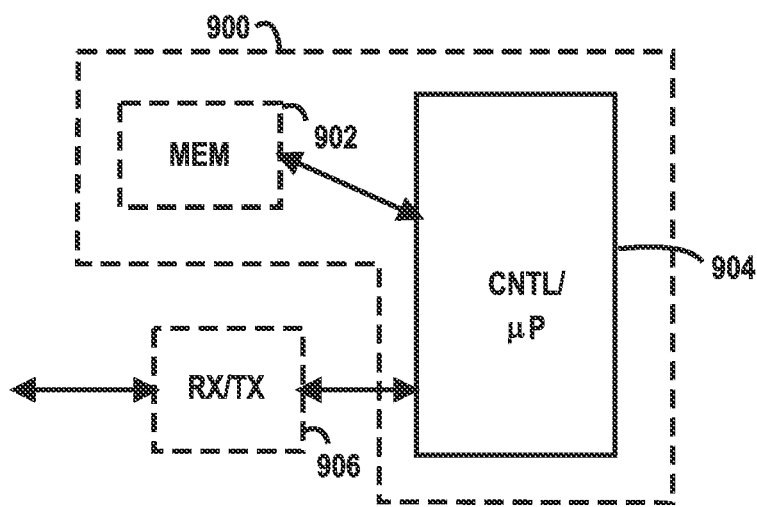

Some embodiments of the present invention are described below, by way of example only, with reference to the accompanying drawings, in which FIG. 1 illustrates an example of a system;
FIG. 2 is a flow chart;
FIG. 3 is an example of signalling;
FIG. 4 is another flow chart;
FIG. 5 is yet another flow chart;
FIG. 6 illustrates an exemplifying arrangement for dynamic spectrum sharing;
FIG. 7 illustrates examples of apparatuses;
FIG. 8 illustrates other examples of apparatuses, and
FIG. 9 illustrates yet other examples of apparatuses.

DESCRIPTION OF EMBODIMENTS

The following embodiments are only examples. Although the specification may refer to "an", "one", or "some" embodiment(s) in several locations, this does not necessarily mean that each such reference is to the same embodiment(s), or that the feature only applies to a single embodiment. Single features of different embodiments may also be combined to provide other embodiments.

Embodiments are applicable to any user device, such as a user terminal, relay node, server, node, corresponding component, and/or to any communication system or any combination of different communication systems that support required functionalities. The communication system may be a wireless communication system or a communication system utilizing both fixed networks and wireless networks. The protocols used, the specifications of communication systems, apparatuses, such as servers and user terminals, especially in wireless communication, develop rapidly. Such development may require extra changes to an embodiment. Therefore, all words and expressions should be interpreted broadly and they are intended to illustrate, not to restrict, embodiments.

In the following, different exemplifying embodiments will be described using, as an example of an access architecture to which the embodiments may be applied, a radio access architecture based on long term evolution advanced (LTE Advanced, LTE-A), that is based on orthogonal frequency multiplexed access (OFDMA) in a downlink and a single-carrier frequency-division multiple access (SC-FDMA) in an uplink, without restricting the embodiments to such an architecture, however. It is obvious for a person skilled in the art that the embodiments may also be applied to other kinds of communications networks having suitable means by adjusting parameters and procedures appropriately.

In an orthogonal frequency division multiplexing (OFDM) system, the available spectrum is divided into multiple orthogonal sub-carriers. In OFDM systems, the available bandwidth is divided into narrower sub-carriers and data is transmitted in parallel streams. Each OFDM symbol is a linear combination of signals on each of the subcarriers. Further, each OFDM symbol is preceded by a cyclic prefix (CP), which is used to decrease Inter-Symbol Interference. Unlike in OFDM, SC-FDMA subcarriers are not independently modulated.

Typically, a (e)NodeB ("e" stands for evolved) needs to know channel quality of each user device and/or the preferred precoding matrices (and/or other multiple input-multiple output (MIMO) specific feedback information, such as channel quantization) over the allocated sub-bands to schedule transmissions to user devices. Such required information is usually signalled to the (e)NodeB.

FIG. 1 depicts examples of simplified system architectures only showing some elements and functional entities, all being logical units, whose implementation may differ from what is shown. The connections shown in FIG. 1 are logical connections; the actual physical connections may be different. It is apparent to a person skilled in the art that the system typically comprises also other functions and structures than those shown in FIG. 1.

The embodiments are not, however, restricted to the system given as an example but a person skilled in the art may apply the solution to other communication systems provided with necessary properties.

FIG. 1 shows a part of a radio access network based on E-UTRA, LTE, LTE-Advanced (LTE-A) or LTE/EPC (EPC=evolved packet core, EPC is enhancement of packet switched technology to cope with faster data rates and growth of Internet protocol traffic). E-UTRA is an air interface of Release 8 (UTRA=UMTS terrestrial radio access, UMTS=universal mobile telecommunications system). Some advantages obtainable by LTE (or E-UTRA) are a possibility to use plug and play devices, and Frequency Division Duplex (FDD) and Time Division Duplex (TDD) in the same platform.

FIG. 1 shows user devices 100 and 102 configured to be in a wireless connection on one or more communication channels 104, 106 in a cell with a (e)NodeB 108 providing the cell. The physical link from a user device to a (e)NodeB is called uplink or reverse link and the physical link from the NodeB to the user device is called downlink or forward link.

The NodeB, or advanced evolved node B (eNodeB, eNB) in LTE-Advanced, is a computing device configured to control the radio resources of communication system it is coupled to. The (e)NodeB may also be referred to as a base station, an access point or any other type of interfacing device including a relay station capable of operating in a wireless environment.

The (e)NodeB includes transceivers, for example. From the transceivers of the (e)NodeB, a connection is provided to an antenna unit that establishes bi-directional radio links to user devices. The antenna unit may comprise a plurality of antennas or antenna elements. The (e)NodeB is further connected to core network 110 (CN). Depending on the system, the counterpart on the CN side can be a serving gateway (S-GW, routing and forwarding user data packets), packet data network gateway (P-GW), for providing connectivity of user devices (UEs) to external packet data networks, or mobile management entity (MME), etc.

A communications system typically comprises more than one (e)NodeB in which case the (e)NodeBs may also be configured to communicate with one another over links, wired or wireless, designed for the purpose. These links may be used for signalling purposes.

The communication system is also able to communicate with other networks, such as a public switched telephone network or the Internet 112. The communication network may also be able to support the usage of cloud services. It should be appreciated that (e)NodeBs or their functionalities may be implemented by using any node, host, server or access point etc. entity suitable for such a usage.

The user device (also called UE, user equipment, user terminal, terminal device, etc.) illustrates one type of an apparatus to which resources on the air interface are allocated and assigned, and thus any feature described herein with a user device may be implemented with a corresponding apparatus, such as a relay node. An example of such a relay node is a layer 3 relay (self-backhauling relay) towards the base station.

The user device typically refers to a portable computing device that includes wireless mobile communication devices operating with or without a subscriber identification module (SIM), including, but not limited to, the following types of devices: a mobile station (mobile phone), smartphone, personal digital assistant (PDA), handset, device using a wireless modem (alarm or measurement device, etc.), laptop and/or touch screen computer, tablet, game console, notebook, and multimedia device.

The user device (or in some embodiments a layer 3 relay node) is configured to perform one or more of user equipment functionalities. The user device may also be called a subscriber unit, mobile station, remote terminal, access terminal, user terminal or user equipment (UE) just to mention but a few names or apparatuses.

It should be understood that, in FIG. 1, user devices are depicted to include 2 antennas only for the sake of clarity. The number of reception and/or transmission antennas may naturally vary according to a current implementation.

Further, although the apparatuses have been depicted as single entities, different units, processors and/or memory units (not all shown in FIG. 1) may be implemented.

It is obvious for a person skilled in the art that the depicted system is only an example of a part of a radio access system and in practise, the system may comprise a plurality of (e)NodeBs, the user device may have an access to a plurality of radio cells and the system may comprise also other apparatuses, such as physical layer relay nodes or other network elements, etc. At least one of the NodeBs or eNodeBs may be a Home(e)nodeB. Additionally, in a geographical area of a radio communication system a plurality of different kinds of radio cells as well as a plurality of radio cells may be provided. Radio cells may be macro cells (or umbrella cells) which are large cells, usually having a diameter of up to tens of kilometres, or smaller cells such as micro-, femto- or picocells. The (e)NodeBs of FIG. 1 may provide any kind of these cells. A cellular radio system may be implemented as a multilayer network including several kinds of cells. Typically, in multilayer networks, one node B provides one kind of a cell or cells, and thus a plurality of node Bs are required to provide such a network structure.

In FIG. 1, node (e)NodeB 114 may also be a Home(e)Node or pico or femto node. It is operably coupled 120 to the (e)NodeB 108 which may provide a macro cell or a primary communication system cell. User device 116 depicts a user device communicating with the (e)NodeB via a radio link 118. The (e)NodeB may be coupled to the core network 110 directly 122 or indirectly via another network node. The eNodeBs may belong to different operators and use different core network as well.

Recently for fulfilling the need for improving the deployment and performance of communication systems, concept of "plug-and-play" node (e)Bs has been introduced. Typically, a network which is able to use "plug-and-play" node (e)Bs, includes, in addition to Home node (e)Bs (Home(e)nodeBs), a home node B gateway, or HNB-GW (not shown in FIG. 1). A HNB Gateway (HNB-GW), which is typically installed within an operator's network aggregates traffic from a large number of HNBs back to a core network through lu-cs and lu-ps interfaces.

With increasing number of personal, local and wireless communication systems operating in a same geographical area, the questions of co-existence and inter-networking are raised. Cognitive and re-configurable radios may be a key for obtaining a heterogeneous communication environment where mitigation techniques and cognitive signalling are used for sharing the spectrum and routing information. Spectrum sharing or flexible spectrum usage between different layers or cells of a same radio access network (RAN), between different RANs of a same operator, (such as part of refarming), between different operators, etc., is recognized as a promising method to enhance the usage of available frequency domain resources. One of the basic sources for spectrum sharing gain is provided by large variations of traffic offered to a cell.

Cognitive radios are designed to efficient spectrum use deploying so-called smart wireless devices being capable to sense and detect the environment and adapt to it thus being suitable for opportunistic spectrum usage, in which also the frequency bands not being used by their primary (usually licensed) users may be utilized by secondary users. For this purpose cognitive radios are designed to detect unused spectrum, such as spectrum holes. Alternatively, network may store information about spectrum resources that are available for a secondary usage. The information on spectrum resources may be combined with geo-location of a device, and thus available spectrum resources for the device in this particular location may be defined.

The heterogeneous networks may also create new challenges due to the deployment of different wireless nodes such as macro/micro eNBs, pico eNBs, and Home eNBs creating a multi-layer network using the same spectrum resource.

To meet LTE-Advanced requirements, support of wider transmission bandwidths is usually required. One option is to provide carrier aggregation. In carrier aggregation, multiple component carriers are aggregated on the physical layer to provide the required bandwidth. Additionally, in carrier aggregation, data to be transmitted may be divided among node apparatuses involved in data transmission. This "data split" may be carried out in many different network elements. One option is a base station or node apparatus having control over transmitting nodes. This provides a close control point for downlink transmission in each radio access link from the network point of view.

In the following, some embodiments are disclosed in further details in relation to FIG. 2. Embodiments relate to evolution of the LTE towards more cognitive spectrum usage in future releases, such as Rel-13. Embodiments provide control arrangement and signalling to facilitate carrier aggregation (CA) based spectrum sharing typically among small non-synchronized cells. Future aspects in carrier aggregation may be inter-site carrier aggregation which differs from Rel-10 carrier aggregation in that eNBs for different carriers may be located on different sites but are suitably synchronized. Additionally, cell-aggregation coordinated multi-point (CoMP) is a concept wherein mainly carrier aggregation related signalling is used to control CoMP transmission/reception over multiple neighbouring cells using a same carrier.

While dynamic spectrum sharing is utilized, fast and reliable control signaling for releasing frequency resources to secondary systems and retrieving resources back to the use of a primary system is usually required. It should be appreciated that connection between neighbouring eNBs may include various number of routers, especially in the case of HeNBs. The wireline latency between neighbouring eNBs may be considerable.

Typically, in a geographical area, a system which is a licensed user has a primary user status and possible ad-hoc users or opportunistic users which are ready to use spectrum holes or corresponding resources are called secondary users. Secondary users are typically not allowed to cause too much interference to primary users.

The operability of a primary system is usually "preferential" in respect of a secondary system which means that the secondary system is not allowed to interfere too much the primary system.

It should be understood that embodiments are not, however, limited to cross-carrier scheduling. It is also possible to utilize a secondary cell for conveying downlink and/or uplink control signals related to the secondary cell. Another option is to convey certain control channels (e.g., physical uplink control channel (PUCCH)) always via a primary cell while some other control channels (e.g., physical downlink control channel (PDCCH) and/or physical HARQ (hybrid automatic repeat request) indicator channel (PHICH)) may be transmitted via the secondary cell.

Embodiments may be carried out in several different environments, but as one especially suitable option is considered the following: pico/femto eNBs have access to at least one carrier for which the corresponding network operator has primary access rights, the at least one carrier is mainly used by a pico/femto layer, (a macro layer may be sharing the at least one carrier, but the macro layer is able to 'escape' on to at least one carrier that does not host pico/femto/HeNB cells deployed in an uncoordinated manner), corresponding carrier assignation mainly for small cells are deployed also by other network operators in the geographical area, and the operator under discussion has secondary access rights to those carriers as a part of a spectrum sharing agreement between the network operators, and enhanced automatic neighbour relation function as well as related user device measurements are used to extend a neighbour relation table to cover also the neighbouring cells of the other network operators under the spectrum sharing agreement. It should be understood that, based on enhanced neighbour detection, eNB may have a wireline connection (for example via an enhanced X2 interface) with its neighbouring eNBs. Additionally, one or more muting masks may be used by a secondary system to protect critical signalling on a primary system against inter-cell interference. Muting may mean dropping a transmission, reducing transmission power, or transmitting only most critical signals (correspondingly to almost blank subframes (ABS)). The muting masks may be semi-static subframe level muting patterns. Creation and usage of intra-subframe muting pattern or mask has been considered in patent application PCT/EP2010/068118, Tiirola, Hulkkonen and Hooli: "Controlling Radio Resource Usage in Communications", which is taken herein as a reference. In this patent application, the muting mask is defined with 12 sub-carrier resolution in frequency domain and OFDM/SC-FDMA symbol resolution in time domain.

Embodiments may be carried out after initialisation or set-up for shared spectrum usage has been carried out. The set-up may be carried out in many different ways depending on system specification followed. One example is now described using an exemplary system comprising two eNBs, one of which is a secondary user (eNB A) and other a primary user (eNB B or a plurality of eNB Bs) of the resource in question. In the shared spectrum usage, the resource is usually a carrier.

It is emphasized that the example presented beneath is herein used only for clarification purposes and it should not be taken as limiting embodiments or their practical implementations by any means. It is obvious for a person skilled in the art that the example is simplified for making following and understanding of some aspects of embodiments easier. It is also obvious for a person skilled in the art that practical network topologies vary case by case basis.

In an example applied to FIG. 1 system, eNB A 108, having primary access user rights on carrier A, requests for carrier B resources to be used based on secondary access rights. It communicates with neighbouring eNB 114 (or eNBs) B having primary access rights on carrier B. The eNB B informs eNB A whether sharing is allowed at the current moment and whether other cells are currently sharing carrier B on secondary access rights, and possible muting masks for protection of critical control signals on cells B, or alternatively, some other sufficient information on signals to be protected on cell/cells B. Then the eNB A instructs one or more user devices 100 to synchronize to neighbouring cell/cells B and to report timing difference as well as carry out measurements on other neighbouring cells currently sharing the carrier B. The new radio connection from user device 100 is shown by reference number 124. Based on neighbouring cell measurements, the eNB A determines whether sharing is feasible. The eNB A informs a positive sharing decision to the neighbouring eNBs B. After that the eNB A configures carrier aggregation to one or more user devices A in order that a primary (usage) cell (Pcell) will be on carrier A and a secondary (usage) cell (Scell) will be on carrier B. The eNB A uses carrier aggregation in order that the one or more user devices will receive scheduling downlink control information only via the primary cell physical downlink control channel (PDCCH) that is a cross-carrier scheduling may be used to schedule secondary cell physical downlink shared channel (PDSCH) and physical uplink shared channel (PUSCH) on the carrier B via the primary (usage) cell PDCCH. Physical uplink control channel (PUCCH) is transmitted on the primary cell. In other words, critical control signalling remains on the primary cell.

One embodiment may be carried out by a primary node of a resource under consideration. The embodiment starts in block 200.

In block 202, a set of changeable sharing profiles are conveyed to a node being a secondary user of the shared spectrum. The set of sharing profiles comprises changeable spectrum sharing conditions.

The set of changeable sharing profiles may include one or more sharing profiles for shared spectrum usage that may be changed during the sharing.

It is emphasized that the example presented beneath is herein used only for clarification purposes and it should not be taken as limiting embodiments or their practical implementations by any means. It is obvious for a person skilled in the art that the example is simplified for making following and understanding of some aspects of embodiments easier. It is also obvious for a person skilled in the art that practical network topologies vary case by case basis. The example will be discussed by using FIG. 3 as illustrative means.

The exemplary signaling is illustrated in FIG. 3. Proportional timing is shown by vertical line 308.

In the example, a secondary user is eNB A 306 and a primary user is eNB B 302 (or a plurality of eNB Bs) of the resource in question. In the shared spectrum usage, the resource is usually a carrier. The eNB B signals to the eNB A via a wireline connection such as X2, a limited set of sharing policies or profiles that are dynamically changeable to adjust spectrum sharing according to current needs, such as to changes in the environment. The usage of a wireline connection makes it possible to keep over-the-air communication between eNB A and B as simple and/or limited as possible. However, it is also an option to use radio connection. Changes in the environment may be changing traffic load on a cell B, etc. The set of sharing policies or profiles may include at least one of the following parameters: sharing according to muting mask/no sharing, sharing according to a muting mask and/or almost blank subframes (ABS) pattern 1, and sharing according to a muting mask and/or ABS pattern 2. One parameter may also be a radio network temporary identifier (RNTI) value associated to the sharing profile set, such as a sharing profile radio network temporary identifier (SP-RNTI). Naturally, ABS patterns 1 and/or 2 may also be informed. An ABS pattern typically means a pattern according to which a subframe is or is not an (almost-)muted subframe.

It should be understood that the eNB A to be able to derive a muting mask, the eNB B usually needs to signal sufficient configuration information on signals determined to be protected. Such information may include at least one of the following: maximum used physical control format indicator channel (PCFICH) value, physical uplink control channel (PUCCH) resources, physical random access channel (PRACH) resources, etc. Additionally, the eNB B may signal at least one sharing profile set, associated SP-RNTI1 value (see the explanation of the used example in relation to block 206), as well as eNB A specific "permanent" dedicated PRACH preamble configuration.

In block 204, at least one sharing profile of the set of changeable sharing profiles is changed during shared spectrum usage.

The change is typically launched by a current need, for example due to changes in radio environment which may be detected by normal interference measurements, for example.

In block 206, change of the at least one sharing profile is indicated to the node being a secondary user of the shared spectrum.

In the example above, the eNB B may change one or more sharing profiles of the sharing profile set by using the following over-the-air signaling: first, the eNB B signals a new sharing profile by sending downlink control information (DCI) on its own physical downlink control channel (PDCCH) and by using sharing profile radio network temporary identifier 1 (SP-RNTI1, identifying the eNB A as a signalling target), where a DCI format includes a new sharing profile indicator (SPI) to a user device (arrow 310). Thus a sharing profile indicator may be used to indicate the change of a sharing profile.

Further in the example, when at least one user device 304 configured with a primary cell of eNB A, cell A and secondary cell on carrier B, receives the PDCCH with SP-RNTI1 on the secondary cell, it conveys the signalled SPI on a primary cell to the eNB A. For that purpose, the at least one user device in the cell A may transmit physical uplink control channel (PUCCH) format 1 by using primary cell PUCCH resource associated with the SPI and the source cell in question (312, 314). It should be appreciated that dedicated physical random access channel (PRACH) preambles may be used instead of PUCCH format 1 for SPI signalling in the cell A.

Then the eNB A acknowledges the reception of the SPI by sending downlink control information (DCI) by using primary cell PDCCH with corresponding SP-RNTI2 (identifying the eNB B as the signalling target), where DCI includes the received sharing profile indicator (317, 318). An additional delay due to PRACH periodicity may exist. This is illustrated with dashed arrows 324 and 326.

After that the at least one user device A conveys the acknowledgement to the eNB B by transmitting a pre-configured dedicated physical random access channel (PRACH) preamble by using secondary cell PRACH (320, 322).

It should be understood that PUCCH detection is normally prioritized in eNB. Hence, the change of sharing profile (stopping and sharing, for example), may affect secondary cell scheduling within 1 ms after receiving (arrow 314). Spectrum sharing may also be stopped after 6 ms in the downlink and after 10 ms in the uplink due to scheduling latency after transmission of 310. This is depicted by arrow 316.

The embodiment ends in block 208. The embodiment is repeatable in many ways. One example is shown by arrow 210 in FIG. 2.

Another embodiment may be carried out by a user device which is a secondary user of the resource under consideration. The embodiment starts in block 400.

In block 402, at least one sharing profile indicator of at least one changed sharing profile of a set of changeable sharing profiles is obtained from a node being a primary user of shared spectrum.

The change of at least one sharing profile may be carried out "on the fly" that is during a spectrum sharing.

A clarifying example of the procedure of changing a sharing profile and possible signaling is explained in further detail above by means of FIGS. 2 and 3. In the example, the eNB B may change one or more sharing profiles of the sharing profile set by following over-the-air signaling: first, the eNB B signals a new sharing profile by sending downlink control information (DCI) on its own physical downlink control channel (PDCCH) identified by sharing profile radio network temporary identifier 1 (SP-RNTI1), where a DCI format includes a new sharing profile indicator (SPI) (312). Thus a sharing profile indicator may be used to indicate the change of a sharing profile.

In block 404, the at least one sharing profile indicator is indicated to a node being a secondary user of the shared spectrum.

Herein it is also referred to FIGS. 2 and 3. In the example, when at least one user device in a primary cell of eNB A, cell A, receives the PDCCH with SP-RNTI1 on a secondary cell, it conveys the signalled SPI on a primary cell to the eNB A. For that purpose, the at least one user device in the cell A may transmit physical uplink control channel (PUCCH) format 1 by using primary cell PUCCH resource associated with the SPI and the source cell in question (314).

A user device may also be configured in a secondary cell on a shared carrier for obtaining and decoding physical downlink control channel (PDCCH) and physical downlink shared channel (PDSCH) on a secondary (usage) cell.

In the example, the configuration of a secondary cell on the carrier B (shared carrier) may be carried out as follows: the user device receives and decodes both physical downlink control channel (PDCCH) and physical downlink shared channel (PDSCH) on the secondary usage cell. Secondary usage cell PDCCH is transmitted by the eNB B (it is a normal cell B PDCCH) and secondary usage cell PDSCH is transmitted and/or received by the eNB A. Hence, a physical cell identifier (PCI) for the PDCCH may be defined separately and it may be different from PCI used on the secondary cell PDSCH and/or physical uplink shared channel (PUSCH).

As to timing, the user device may measure timing difference between primary usage cell and secondary usage cell, and report results to the eNB A before spectrum sharing is taking place. The user device may report the timing difference as a part of component carrier specific channel quality indicator (CQI) report as well (aperiodic and/or periodic) transmitted by using the primary cell. Based on measurement reports from a plurality of user devices and covering possibly also a plurality of neighbouring cells B (secondary usage cell or secondary cell), the eNB may adjust secondary (usage) cell PDSCH timing in such a manner that PDSCH does not overlap with PDCCH of any neighbouring cell B. Additionally, the length of the PDSCH in terms of OFDM symbols may be shortened to enable different timing between neighbouring cells B and, if needed, for possible timing estimation errors.

More specifically, timing may be carried out as follows: the user device acquires downlink timing of cell B, carries out channel estimation and uses the timing and channel estimates for detecting secondary (usage) cell PDCCH. The user device may also determine secondary cell PDSCH and PUSCH timing based on downlink timing of the primary (usage) cell and timing advance commands received via primary cell for secondary cell PDSCH and PUSCH. In other words, multi-timing advance may be applied to PUSCH, and additionally separate timing advance commands may be applied to secondary cell PDSCH timing.

A user device may be configured to use several secondary cells on a same secondary usage carrier in order to establish over-the-air control signalling to multiple neighbouring secondary cells. Alternatively, a plurality of user devices may be configured to different secondary cells using a same secondary carrier in such a manner that PDCCHs from the multiple neighboring secondary cells may be monitored.

In block 406, an acknowledgement of indication of the at least one sharing profile indicator is obtained from the node being the secondary user of the shared spectrum and conveyed to the node being a primary user of the shared spectrum.

Yet in the example of FIGS. 2 and 3, the eNB A acknowledges the reception of the SPI by sending downlink control information (DCI) by using primary cell PDCCH with corresponding SP-RNTI2, where DCI includes the received sharing profile indicator (317, 318). After that the at least one user device A conveys the acknowledgement to the eNB B by transmitting a pre-configured dedicated physical random access channel (PRACH) preamble by using secondary cell PRACH (322). It should be appreciated that PRACH may be used to provide an option to loosen secondary cell uplink synchronization requirements with eNB B.

As described using the related clarifying example, it should be understood that as a part of secondary cell configuration, a user device typically needs to obtain a physical cell identifier of the related cell B, SP-RNTI1 (the eNB A as signalling target), SP-RNTI2 (identifying the eNB B as the signalling target), physical uplink control channel (PUCCH) format 1 configuration for each sharing profile index related to the eNB B (or cell B), configuration of physical random access channel (PRACH) and a dedicated preamble on the cell B (identifying the eNB A as source of acknowledgement), and a secondary cell physical downlink shared channel (PDSCH) specific timing advance.

It is also an option to provide user device frequency synchronization on a secondary cell. This may be carried out by using secondary cell channel quality indicator (CQI) reports containing timing difference. In the example, the user device may signal (coarse) frequency offset between eNB B's and eNB A's secondary cell reference signals, hence allowing the eNB A to correct a possible frequency error.

The embodiment ends in block 408. The embodiment is repeatable in many ways. One example is shown by arrow 410 in FIG. 4.

Yet another embodiment may be carried out by a secondary node of a resource under consideration. The embodiment starts in block 500.

In block 502, a set of changeable sharing profiles are obtained by a node being a secondary user of the shared spectrum. The set of changeable sharing profiles comprises changeable spectrum sharing conditions.

In an example, an eNB B signals to eNB A a limited set of sharing policies or profiles that are dynamically changeable to adjust spectrum sharing to a changing environment, such as to adjust to changing traffic load on a cell B. The sharing profile set may include at least one of the following parameters: sharing according to muting mask/no sharing, sharing according to a muting mask and/or almost blank subframes (ABS) pattern 1, and sharing according to a muting mask and/or ABS pattern 2. One parameter may also be a radio network temporary identifier (RNTI) value associated to the sharing profile set, such as a sharing profile radio network temporary identifier (SP-RNTI). Naturally, ABS patterns 1 and/or 2 may also be informed.

In block 504, at least one sharing profile indicator of at least one changed sharing profile of the set of changeable sharing profiles is obtained.

A clarifying example of the procedure of changing a sharing profile and possible signaling is explained in further detail above by means of FIGS. 2 and 3. In the example, the eNB B may change one or more sharing profiles of the sharing profile set by following over-the-air signaling: first, the eNB B signals a new sharing profile by sending downlink control information (DCI) on its own physical downlink control channel (PDCCH) by sharing profile radio network temporary identifier 1 (SP-RNTI1), where a DCI format includes a new sharing profile indicator (SPI) (312). Thus a sharing profile indicator may be used to indicate the change of a sharing profile.

Further in the example, when at least one user device in a primary cell of eNB A, cell A, receives the PDCCH with SP-RNTI1 on a secondary cell, it conveys the signalled SPI on a primary cell to the eNB A. For that purpose, the at least one user device in the cell A may transmit physical uplink control channel (PUCCH) format 1 by using primary cell PUCCH resource associated with the SPI and the source cell in question (314).

In block 506, an acknowledgement of obtaining the sharing profile indicator of at least one changed sharing profile of the set of changeable sharing profiles is conveyed.

Yet in the example of FIGS. 2 and 3, the eNB A acknowledges the reception of the SPI by sending downlink control information (DCI) by using primary cell PDCCH with corresponding SP-RNTI2, where DCI includes the received sharing profile indicator (317, 318). After that the at least one user device A conveys the acknowledgement to the eNB B by transmitting a pre-configured dedicated physical random access channel (PRACH) preamble by using secondary cell PRACH (322).

It is also an option to provide user device frequency synchronization on a secondary cell. This may be carried out by the eNB A transmitting a primary synchronization signal (PSS) and/or secondary synchronization signal (SSS) with a sub-frame offset in such a manner that they do not overlap with eNB B's corresponding signals and possibly using sequences not normally used for this purpose in the LTE. As a part of the secondary cell channel quality indicator (CQI) reports containing timing difference, a user device may also signal (coarse) frequency offset between eNB B's and eNB A's secondary cell reference signals, hence allowing the eNB A to correct a possible frequency error.

Additionally, as put forward by means of the example used above, when the eNB A adjusts secondary cell physical downlink shared channel (PDSCH) timing, it typically needs to ensure that the processing times of user devices remain in practically reasonable limits. In other words, in a usual case, PDSCH should not overlap in time with physical downlink control channel (PDCCH) on a primary cell and that PDSCH should not be delayed more than 666.64 s (corresponding to maximum initial timing advance in LTE Rel-8).

The embodiment ends in block 508. The embodiment is repeatable in many ways. One example is shown by arrow 510 in FIG. 5.

An exemplary arrangement for spectrum sharing per an LTE subframe is illustrated in FIG. 6. In the example, two non-synchronized cells (B1 and B2) on carrier B are found to be neighbouring cells to cell A on carrier A. In the Figure, subframes are marked with even-numbered reference numbers 612-634. Small blocks within the subframes depict OFDM symbols of 112 subcarriers, one of which is depicted with reference number 606.

It is emphasized that the example is herein used only for clarification purposes and it should not be taken as limiting embodiments or their practical implementations by any means. It is obvious for a person skilled in the art that the example is simplified for making following and understanding of some aspects of embodiments easier.

In this example, based on received information from eNB B1 and B2, physical downlink control channel (PDCCH), physical HARQ indicator channel (PHICH) (HARQ=hybrid automatic repeat request), broadcast channel (BCH) and primary synchronization signal/secondary synchronization signal (PSS/SSS) are determined to be protected for both cells. Additionally, spectrum sharing seems feasible with reasonable almost blank subframes (ABS) pattern based on received sharing profiles and measurement reports obtained by a user device including timing information. Correspondingly, eNB A sets two component carriers that is secondary (usage) cell (Scell) B1 600 and secondary cell (Scell) B2 602 on carrier B in such a manner that over-the-air control signalling may be established for both cells B1 and B2. Secondary cell B1 and B2 differ from each other only in the secondary cell physical downlink control channel (PDCCH) to be monitored (either B1 or B2). To protect primary cell B1 and B2 control signals as well as facilitate detection of PDCCH of the user device from B1 or B2, the eNB A sets appropriate timing offset for secondary cell physical downlink shared channel (PDSCH). Some PDSCH scheduling options are shown by reference number 610A and 610B, and the exemplary timing offset by reference number 608. Additionally, it sets a PDSCH muting mask, where the last 3 OFDM symbols are dropped that is secondary cell PDSCH is shortened to protect cell B2 PDCCH and PHICH signaling. The muting mask is naturally only an option and other muting masks may be used as well. Primary cell on carrier A is depicted by reference number 604.

With regard to embodiments discussed above, it is noted that for reliability of proposed signaling, it is possible to utilize current smallest PDCCH payload size option for SPI, which typically is DCI Format 1C. For maximizing the coverage of the SPI carrying DCI while not increasing the number of PDCCH blind decoding at a user device, it may be advantageous to utilize the smallest PDCCH payload size option for SPI, which usually is also DCI Format 1C. If multiple active user devices having an active secondary cell are provided, reliability may be increased by user device diversity: all configured user devices try to receive control signalling and relay detected control signalling to a target eNB. Transmissions from these user devices are usually non-coherently combined over the air interface as only one resource is used per SPI in a cell. Additionally, signalling may be repeated in consecutive subframes, in case the need exists to improve reliability. It is typically also an option to provide a wireline connection as a final fall-back method in the event of failed over-the-air communications.

The steps/points, signaling messages and related functions described above in FIG. 2, 3, 4, 5 or 6 are in no absolute chronological order, and some of the steps/points may be performed simultaneously or in an order differing from the given one. Other functions may also be executed between the steps/points or within the steps/points and other signaling messages sent between the illustrated messages. Some of the steps/points or part of the steps/points can also be left out or replaced by a corresponding step/point or part of the step/point.

It should be understood that conveying, transmitting and/or receiving may herein mean preparing a data conveyance, transmission and/or reception, preparing a message to be conveyed, transmitted and/or received, or physical transmission and/or reception itself, etc. on a case by case basis.

An embodiment provides an apparatus which may be any remote-site, server, node (home node, relay node, etc.), host or any other suitable apparatus capable to carry out processes described above in relation to FIG. 2.

FIG. 7 illustrates a simplified block diagram of an apparatus according to an embodiment.

As an example of an apparatus according to an embodiment, it is shown an apparatus 700, such as a remote-site or radio head, including facilities in a control unit 704 (including one or more processors, for example) to carry out functions of embodiments according to FIG. 2.

In FIG. 7, block 706 includes parts/units/modules needed for reception and transmission, usually called a radio front end, RF-parts, radio parts, etc.

Another example of an apparatus 700 may include at least one processor 704 and at least one memory 702 including a computer program code, the at least one memory and the computer program code configured to, with the at least one processor, cause the apparatus at least to: convey a set of changeable sharing profiles to a node being a secondary user of the shared spectrum, the set of changeable sharing profiles comprising changeable spectrum sharing conditions, change at least one sharing profile of the set of changeable sharing profiles during shared spectrum usage, and indicate the change of the at least one sharing profile to the node being the secondary user of the shared spectrum.

Yet another example of an apparatus comprises means 704 (706) for conveying a set of changeable sharing profiles to a node being a secondary user of the shared spectrum, the set of changeable sharing profiles comprising changeable spectrum sharing conditions, means 704 for changing at least one sharing profile of the set of changeable sharing profiles during shared spectrum usage, and means 704 (706) for indicating the change of the at least one sharing profile to the node being the secondary user of the shared spectrum.

Yet another example of an apparatus comprises a conveying unit configured to convey a set of changeable sharing profiles to a node being a secondary user of the shared spectrum, the set of changeable sharing profiles comprising changeable spectrum sharing conditions, a changer configured to change at least one sharing profile of the set of changeable sharing profiles during shared spectrum usage, and an indicating unit configured to indicate the change of the at least one sharing profile to the node being the secondary user of the shared spectrum.

It should be understood that the apparatuses may include or be coupled to other units or modules etc, such as radio parts or radio heads, used in or for transmission and/or reception. This is depicted in FIG. 7 as an optional block 706.

Although the apparatuses have been depicted as one entity in FIG. 7, different modules and memory may be implemented in one or more physical or logical entities.

An embodiment provides an apparatus which may be any user device, home node, web stick or any other suitable apparatus capable to carry out processes described above in relation to FIG. 4.

FIG. 8 illustrates a simplified block diagram of an apparatus according to an embodiment.

As an example of an apparatus according to an embodiment, it is shown an apparatus 800, such as a user device, including facilities in a control unit 804 (including one or more processors, for example) to carry out functions of embodiments according to FIG. 4.

In FIG. 8, block 806 includes parts/units/modules needed for reception and transmission, usually called a radio front end, RF-parts, radio parts, etc.

Another example of an apparatus 800 may include at least one processor 804 and at least one memory 802 including a computer program code, the at least one memory and the computer program code configured to, with the at least one processor, cause the apparatus at least to: obtain at least one sharing profile indicator of at least one changed sharing profile of a set of changeable sharing profiles from a node being a primary user of shared spectrum, indicate the at least one sharing profile indicator to a node being a secondary user of the shared spectrum, and obtain an acknowledgement of indication of the at least one sharing profile indicator from the node being the secondary user of the shared spectrum an convey the acknowledgement to the node being the primary user of the shared spectrum.

Yet another example of an apparatus comprises means 804 (806) for obtaining at least one sharing profile indicator of at least one changed sharing profile of a set of changeable sharing profiles from a node being a primary user of shared spectrum, means for 804 (806) for indicating the at least one sharing profile indicator to a node being a secondary user of the shared spectrum, and means 804 (806) for obtaining an acknowledgement of indication of the at least one sharing profile indicator from the node being the secondary user of the shared spectrum an convey the acknowledgement to the node being the primary user of the shared spectrum.

Yet another example of an apparatus comprises a first obtainer configured to obtain at least one sharing profile indicator of at least one changed sharing profile of a set of changeable sharing profiles from a node being a primary user of shared spectrum, in indicating unit configured to indicate the at least one sharing profile indicator to a node being a secondary user of the shared spectrum, and a second obtainer configured to obtain an acknowledgement of indication of the at least one sharing profile indicator from the node being the secondary user of the shared spectrum an convey the acknowledgement to the node being the primary user of the shared spectrum.

It should be understood that the apparatuses may include or be coupled to other units or modules etc, such as radio parts or radio heads, used in or for transmission and/or reception. This is depicted in FIG. 8 as an optional block 806. Additionally, a first obtainer and a second obtainer may be included in a same unit or be located in separate units.

Although the apparatuses have been depicted as one entity in FIG. 8, different modules and memory may be implemented in one or more physical or logical entities.

An embodiment provides an apparatus which may be any remote-site, server, node (home node, relay node, etc.), host or any other suitable apparatus capable to carry out processes described above in relation to FIG. 5.

FIG. 9 illustrates a simplified block diagram of an apparatus according to an embodiment.

As an example of an apparatus according to an embodiment, it is shown an apparatus 900, such as a remote-site or radio head, including facilities in a control unit 904 (including one or more processors, for example) to carry out functions of embodiments according to FIG. 5.

In FIG. 9, block 906 includes parts/units/modules needed for reception and transmission, usually called a radio front end, RF-parts, radio parts, etc.

Another example of an apparatus 900 may include at least one processor 904 and at least one memory 902 including a computer program code, the at least one memory and the computer program code configured to, with the at least one processor, cause the apparatus at least to: obtain a set of changeable sharing profiles from a node being a secondary user or a primary user of the shared spectrum, the set of sharing profiles comprising changeable spectrum sharing conditions, obtain at least one sharing profile indicator of at least one changed sharing profile of the set of changeable sharing profiles, and convey an acknowledgement of obtaining the sharing profile indicator of at least one changed sharing profile of the set of changeable sharing profiles.

Yet another example of an apparatus comprises means 904 (906) for obtaining a set of changeable sharing profiles from a node being a secondary user or a primary user of the shared spectrum, the set of sharing profiles comprising changeable spectrum sharing conditions, means 904 (906) for obtaining at least one sharing profile indicator of at least one changed sharing profile of the set of changeable sharing profiles, and means 904 (906) for conveying an acknowledgement of obtaining the sharing profile indicator of at least one changed sharing profile of the set of changeable sharing profiles.

Yet another example of an apparatus comprises a first obtainer configured to obtain a set of changeable sharing profiles from a node being a secondary user or a primary user of the shared spectrum, the set of sharing profiles comprising changeable spectrum sharing conditions, a second obtainer configured to obtain at least one sharing profile indicator of at least one changed sharing profile of the set of changeable sharing profiles, and a conveying unit configured to convey an acknowledgement of obtaining the sharing profile indicator of at least one changed sharing profile of the set of changeable sharing profiles.

It should be understood that the apparatuses may include or be coupled to other units or modules etc, such as radio parts or radio heads, used in or for transmission and/or reception. This is depicted in FIG. 9 as an optional block 906. Additionally, a first obtainer and a second obtainer may be included in a same unit or be located in separate units.

Although the apparatuses have been depicted as one entity in FIG. 9, different modules and memory may be implemented in one or more physical or logical entities.

An apparatus may in general include at least one processor, controller or a unit designed for carrying out control functions operably coupled to at least one memory unit and to various interfaces. Further, the memory units may include volatile and/or non-volatile memory. The memory unit may store computer program code and/or operating systems, information, data, content or the like for the processor to perform operations according to embodiments. Each of the memory units may be a random access memory, hard drive, etc. The memory units may be at least partly removable and/or detachably operationally coupled to the apparatus. The memory may be of any type suitable for the current technical environment and it may be implemented using any suitable data storage technology, such as semiconductor-based technology, flash memory, magnetic and/or optical memory devices. The memory may be fixed or removable.

The apparatus may be a software application, or a module, or a unit configured as arithmetic operation, or as a program (including an added or updated software routine), executed by an operation processor. Programs, also called program products or computer programs, including software routines, applets and macros, may be stored in any apparatus-readable data storage medium and they include program instructions to perform particular tasks. Computer programs may be coded by a programming language, which may be a high-level programming language, such as objective-C, C, C++, Java, etc., or a low-level programming language, such as a machine language, or an assembler.

Modifications and configurations required for implementing functionality of an embodiment may be performed as routines, which may be implemented as added or updated software routines, application circuits (ASIC) and/or programmable circuits. Further, software routines may be downloaded into an apparatus. The apparatus, such as a node device, or a corresponding component, may be configured as a computer or a microprocessor, such as single-chip computer element, or as a chipset, including at least a memory for providing storage capacity used for arithmetic operation and an operation processor for executing the arithmetic operation.

Embodiments provide computer programs embodied on a distribution medium, comprising program instructions which, when loaded into electronic apparatuses, constitute the apparatuses as explained above. The distribution medium may be a non-transitory medium.

Other embodiments provide computer programs embodied on a computer readable storage medium, configured to control a processor to perform embodiments of the methods described above. The computer readable storage medium may be a non-transitory medium.

The computer program may be in source code form, object code form, or in some intermediate form, and it may be stored in some sort of carrier, distribution medium, or computer readable medium, which may be any entity or device capable of carrying the program. Such carriers include a record medium, computer memory, read-only memory, electrical carrier signal, telecommunications signal, and software distribution package, for example. Depending on the processing power needed, the computer program may be executed in a single electronic digital computer or it may be distributed amongst a number of computers. The computer readable medium or computer readable storage medium may be a non-transitory medium.

The techniques described herein may be implemented by various means. For example, these techniques may be implemented in hardware (one or more devices), firmware (one or more devices), software (one or more modules), or combinations thereof. For a hardware implementation, the apparatus may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, digitally enhanced circuits, other electronic units designed to perform the functions described herein, or a combination thereof. For firmware or software, the implementation may be carried out through modules of at least one chip set (e.g., procedures, functions, and so on) that perform the functions described herein. The software codes may be stored in a memory unit and executed by processors. The memory unit may be implemented within the processor or externally to the processor. In the latter case it may be communicatively coupled to the processor via various means, as is known in the art. Additionally, the components of systems described herein may be rearranged and/or complimented by additional components in order to facilitate achieving the various aspects, etc., described with regard thereto, and they are not limited to the precise configurations set forth in the given figures, as will be appreciated by one skilled in the art.

It will be obvious to a person skilled in the art that, as technology advances, the inventive concept may be implemented in various ways. The invention and its embodiments are not limited to the examples described above but may vary within the scope of the claims.

The invention claimed is:

1. An apparatus comprising:
at least one processor and at least one memory including a computer program code, the at least one memory and the computer program code configured to, with the at least one processor, cause the apparatus at least to:
convey, by a primary node, a set of changeable sharing profiles to a node being a secondary user of the shared spectrum, the set of changeable sharing profiles comprising a limited set of spectrum sharing conditions or policies changeable for adjusting spectrum sharing according to a need;
change at least one sharing profile of the set of changeable sharing profiles during shared spectrum usage, and
indicate the change of the at least one sharing profile to the node being the secondary user of the shared spectrum.

2. The apparatus of claim 1, wherein the changeable sharing profile set comprises at least one of the following: sharing according to muting mask/no sharing, sharing according to a muting mask and/or almost blank subframes (ABS) pattern 1, sharing according to a muting mask and/or almost blank subframe pattern 2, a radio network temporary identifier (RNTI) value associated to the sharing profile set.

3. The apparatus of claim 1, wherein the change of at least one sharing profile is indicated by sending downlink control information (DCI) on a physical downlink control channel (PDCCH) and by using sharing profile radio network temporary identifier identifying the node being the secondary user of the shared spectrum as a signalling target, sharing profile radio network temporary identifier identifying the node being the primary user of the shared spectrum as a signalling target, wherein a downlink control information format comprises a sharing profile indicator (SPI).

4. The apparatus of claim 1, further being configured to:
convey information for protecting signals by a muting mask, the information comprising at least one of the following: maximum used physical control format indicator channel (PCFICH) value, physical uplink control channel (PUCCH) resources, and physical random access channel (PRACH) resource.

5. An apparatus comprising:
at least one processor and at least one memory including a computer program code, the at least one memory and the computer program code configured to, with the at least one processor, cause the apparatus at least to:
obtain, by a user device, at least one sharing profile indicator of at least one changed sharing profile of a set of changeable sharing profiles from a node being a primary user of shared spectrum, wherein the set of changeable sharing profiles comprises a limited set of sharing policies or profiles that are changeable for adjusting spectrum sharing according to need;
indicate the at least one sharing profile indicator to a node being a secondary user of the shared spectrum, and
obtain an acknowledgement of indication of the at least one sharing profile indicator from the node being the secondary user of the shared spectrum and convey the acknowledgement to the node being the primary user of the shared spectrum.

6. The apparatus of claim 5, wherein the changeable sharing profile set comprises at least one of the following: sharing according to muting mask/no sharing, sharing according to a muting mask and/or almost blank subframe (ABS) pattern 1, sharing according to a muting mask and/or almost blank subframe pattern 2, a radio network temporary identifier (RNTI) value associated to the sharing profile set.

7. The apparatus of claim 5, further being configured to:
configure a secondary cell on a shared carrier, the configuring comprising: obtaining from the primary user node and decoding secondary cell physical downlink control channel (PDCCH), and obtaining from the secondary user node physical downlink shared channel (PDSCH) on a secondary usage cell.

8. The apparatus of claim 5, further being configured to:
measure timing difference between primary usage cell and secondary usage cell and report results to the node being the secondary user of the shared spectrum before spectrum sharing is taking place.

9. The apparatus of claim 5, further being configured to:
convey the acknowledgement by transmitting a pre-configured dedicated physical random access channel (PRACH) preamble by using secondary cell physical random access channel (PRACH).

10. An apparatus comprising:
at least one processor and at least one memory including a computer program code, the at least one memory and the computer program code configured to, with the at least one processor, cause the apparatus at least to:
obtain, by a secondary node, a set of changeable sharing profiles from a node being a primary user of the shared spectrum, the set of sharing profiles comprising a limited set of spectrum sharing conditions or policies changeable for adjusting spectrum sharing according to a need;
obtain at least one sharing profile indicator of at least one changed sharing profile of the set of changeable sharing profiles, and
convey an acknowledgement of obtaining the sharing profile indicator of at least one changed sharing profile of the set of changeable sharing profiles.

11. The apparatus of claim 10, wherein the changeable sharing profile set comprises at least one of the following: sharing according to muting mask/no sharing, sharing according to a muting mask and/or almost blank subframe (ABS) pattern 1, sharing according to a muting mask and/or almost blank subframe pattern 2, a radio network temporary identifier (RNTI) value associated to the sharing profile set.

12. The apparatus of claim 10, wherein the acknowledgement is conveyed by sending downlink control information (DCI) by using physical downlink control channel (PDCCH) with corresponding sharing profile radio network temporary identifier identifying the node being the primary user of the shared spectrum as a signalling target, wherein the downlink control information comprises a sharing profile indicator.

13. A method comprising:
conveying by a primary node a set of changeable sharing profiles to a node being a secondary user of the shared spectrum, the set of changeable sharing profiles comprising a limited set of spectrum sharing conditions or policies changeable for adjusting spectrum sharing according to a need;
changing at least one sharing profile of the set of changeable sharing profiles during shared spectrum usage, and
indicating the change of the at least one sharing profile to the node being the secondary user of the shared spectrum.

14. The method of claim 13, wherein the changeable sharing profile set comprises at least one of the following: sharing according to muting mask/no sharing, sharing according to a muting mask and/or almost blank subframe (ABS) pattern 1, sharing according to a muting mask and/or almost blank subframe pattern 2, a radio network temporary identifier (RNTI) value associated to the sharing profile set.

15. The method of claim 13, wherein the change of at least one sharing profile is indicated by sending downlink control information (DCI) on a physical downlink control channel (PDCCH) and by using sharing profile radio network temporary identifier identifying the node being the secondary user of the shared spectrum as a signalling target, sharing profile radio network temporary identifier identifying the node being the primary user of the shared spectrum as a signalling target, wherein a downlink control information format comprises a sharing profile indicator (SPI).

16. The method of claim 13, further comprising: conveying information for protecting signals by a muting mask, the information comprising at least one of the following: maximum used physical control format indicator channel (PCFICH) value, physical uplink control channel (PUCCH) resources, and physical random access channel (PRACH) resource.

17. A method comprising:
obtaining by a user device at least one sharing profile indicator of at least one changed sharing profile of a set of changeable sharing profiles from a node being a primary user of shared spectrum;
indicating the at least one sharing profile indicator to a node being a secondary user of the shared spectrum, wherein the set of changeable sharing profiles comprises a limited set of sharing policies or profiles that are changeable for adjusting spectrum sharing according to need, and obtaining an acknowledgement of indication of the at least one sharing profile indicator from the node being the secondary user of the shared spectrum and convey the acknowledgement to the node being the primary user of the shared spectrum.

18. The method of claim 17, wherein the changeable sharing profile set comprises at least one of the following: sharing according to muting mask/no sharing, sharing according to a muting mask and/or almost blank subframe (ABS) pattern 1, sharing according to a muting mask and/or almost blank subframe pattern 2, a radio network temporary identifier (RNTI) value associated to the sharing profile set.

19. The method of claim 17, further comprising:
configuring a secondary cell on a shared carrier, the configuring comprising: obtaining from the primary user node and decoding secondary cell physical downlink control channel (PDCCH), and obtaining from the secondary user node physical downlink shared channel (PDSCH) on a secondary usage cell.

20. The method of claim 17, further comprising: measuring timing difference between primary usage cell and secondary usage cell and report results to the node being the secondary user of the shared spectrum before spectrum sharing is taking place.

21. The method of claim 17, further comprising: conveying the acknowledgement by transmitting a pre-configured dedicated physical random access channel (PRACH) preamble by using secondary cell physical random access channel (PRACH).

22. A method comprising:
obtaining, by a secondary node, a set of changeable sharing profiles from a node being a primary user of the shared spectrum, the set of sharing profiles comprising a limited set of spectrum sharing conditions or policies changeable for adjusting spectrum sharing according to a need;
obtaining at least one sharing profile indicator of at least one changed sharing profile of the set of changeable sharing profiles, and
conveying an acknowledgement of obtaining the sharing profile indicator of at least one changed sharing profile of the set of changeable sharing profiles.

23. The method of claim 22, wherein the changeable sharing profile set comprises at least one of the following: sharing according to muting mask/no sharing, sharing according to a muting mask and/or almost blank subframe (ABS) pattern 1, sharing according to a muting mask and/or almost blank subframe pattern 2, a radio network temporary identifier (RNTI) value associated to the sharing profile set.

24. The method of claim 22, wherein the acknowledgement is conveyed by sending downlink control information (DCI) by using physical downlink control channel (PDCCH) with corresponding sharing profile radio network temporary identifier identifying the node being the primary user of the shared spectrum as a signalling target, wherein the downlink control information comprises a sharing profile indicator.

25. A computer-readable storage medium tangibly embodying program code for controlling a primary node to execute a process, the process comprising:
conveying by the primary node a set of changeable sharing profiles to a node being a secondary user of the shared spectrum, the set of changeable sharing profiles comprising a limited set of spectrum sharing conditions or policies changeable for adjusting spectrum sharing according to a need;
changing at least one sharing profile of the set of changeable sharing profiles during shared spectrum usage, and
indicating the change of the at least one sharing profile to the node being the secondary user of the shared spectrum.

26. A computer-readable storage medium tangibly embodying program code for controlling a user device to execute a process, the process comprising:
obtaining by the user device at least one sharing profile indicator of at least one changed sharing profile of a set of changeable sharing profiles from a node being a primary user of shared spectrum, wherein the set of changeable sharing profiles comprises a limited set of sharing policies or profiles that are changeable for adjusting spectrum sharing according to need;
indicating the at least one sharing profile indicator to a node being a secondary user of the shared spectrum, and
obtaining an acknowledgement of indication of the at least one sharing profile indicator from the node being the secondary user of the shared spectrum and convey the acknowledgement to the node being the primary user of the shared spectrum.

27. A computer-readable storage medium tangibly embodying program code for controlling a secondary node to execute a process, the process comprising:
obtaining a set of changeable sharing profiles from a node being a secondary user or a primary user of the shared spectrum, the set of sharing profiles comprising a limited set of spectrum sharing conditions or policies changeable for adjusting spectrum sharing according to a need;
obtaining at least one sharing profile indicator of at least one changed sharing profile of the set of changeable sharing profiles, and
conveying an acknowledgement of obtaining the sharing profile indicator of at least one changed sharing profile of the set of changeable sharing profiles.

\* \* \* \* \*